United States Patent [19]
Boyle

[11] 3,717,257
[45] Feb. 20, 1973

[54] PERIPHERAL FEED AND EFFLUENT SYSTEM FOR SEDIMENTATION TANKS

[75] Inventor: William H. Boyle, Milwaukee, Wis.
[73] Assignee: Rex Chainbelt Inc., Milwaukee, Wis.
[22] Filed: Dec. 7, 1971
[21] Appl. No.: 205,607

[52] U.S. Cl..................................210/521, 210/525
[51] Int. Cl. ...............................................B01d 21/00
[58] Field of Search........210/83, 519, 520, 521, 523, 210/524, 525, 528, 532, 536, 305, 320

[56] References Cited

UNITED STATES PATENTS 3,395,800  8/1968  Kraus et al..........................210/83 X
1,226,893  5/1917  Keeney et al.....................210/532 X Primary Examiner—Reuben Friedman
Assistant Examiner—T. A. Granger
Attorney—Ernst W. Schultz

[57] ABSTRACT

A sedimentation tank of simplified construction has a single horizontal shelf projecting inwardly from the outer wall of the tank. The shelf is of uniform width and an upright wall at its inner periphery forms the overflow weir of the tank. A dividing wall carried by the shelf between the inner wall and the upper portion of the tank wall defines therewith inner and outer feed distribution and effluent channels of complementary cross-sections. An inner scum baffle is uniformly spaced inwardly of the weir and is concentric with respect to the vertical axis of the rotating sludge removal mechanism at the center of the tank.

11 Claims, 8 Drawing Figures

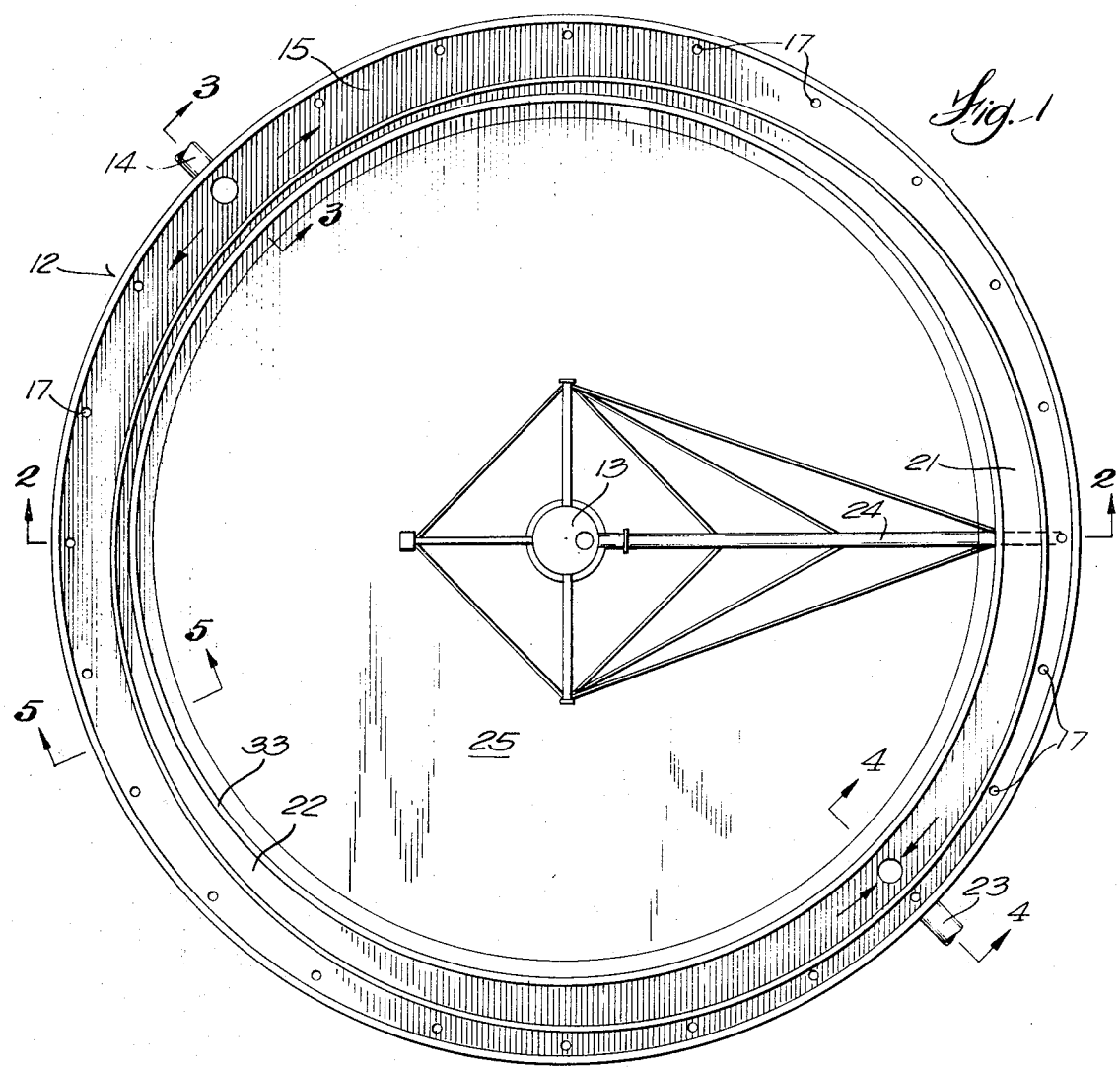
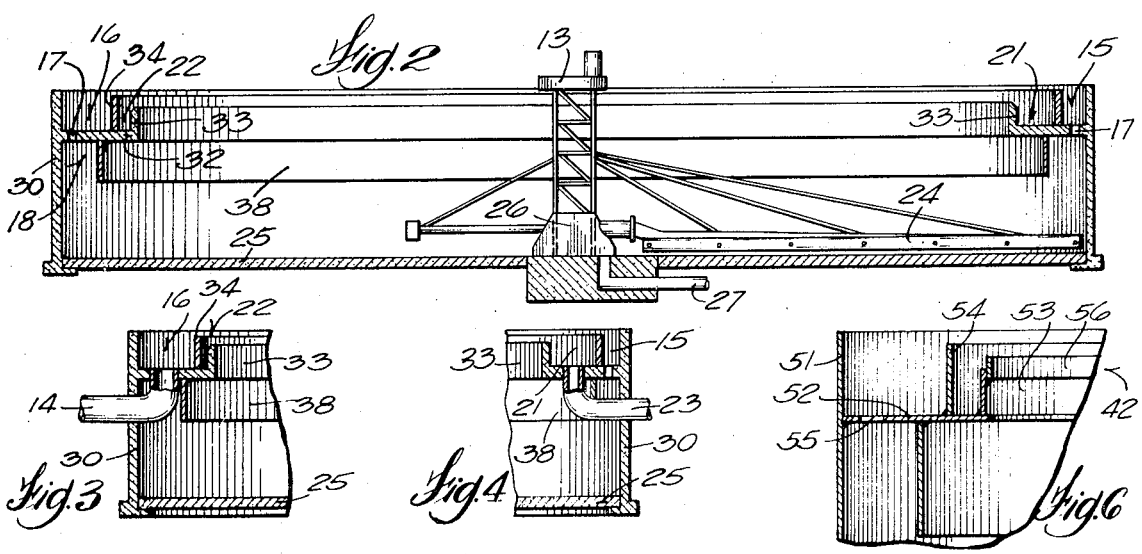

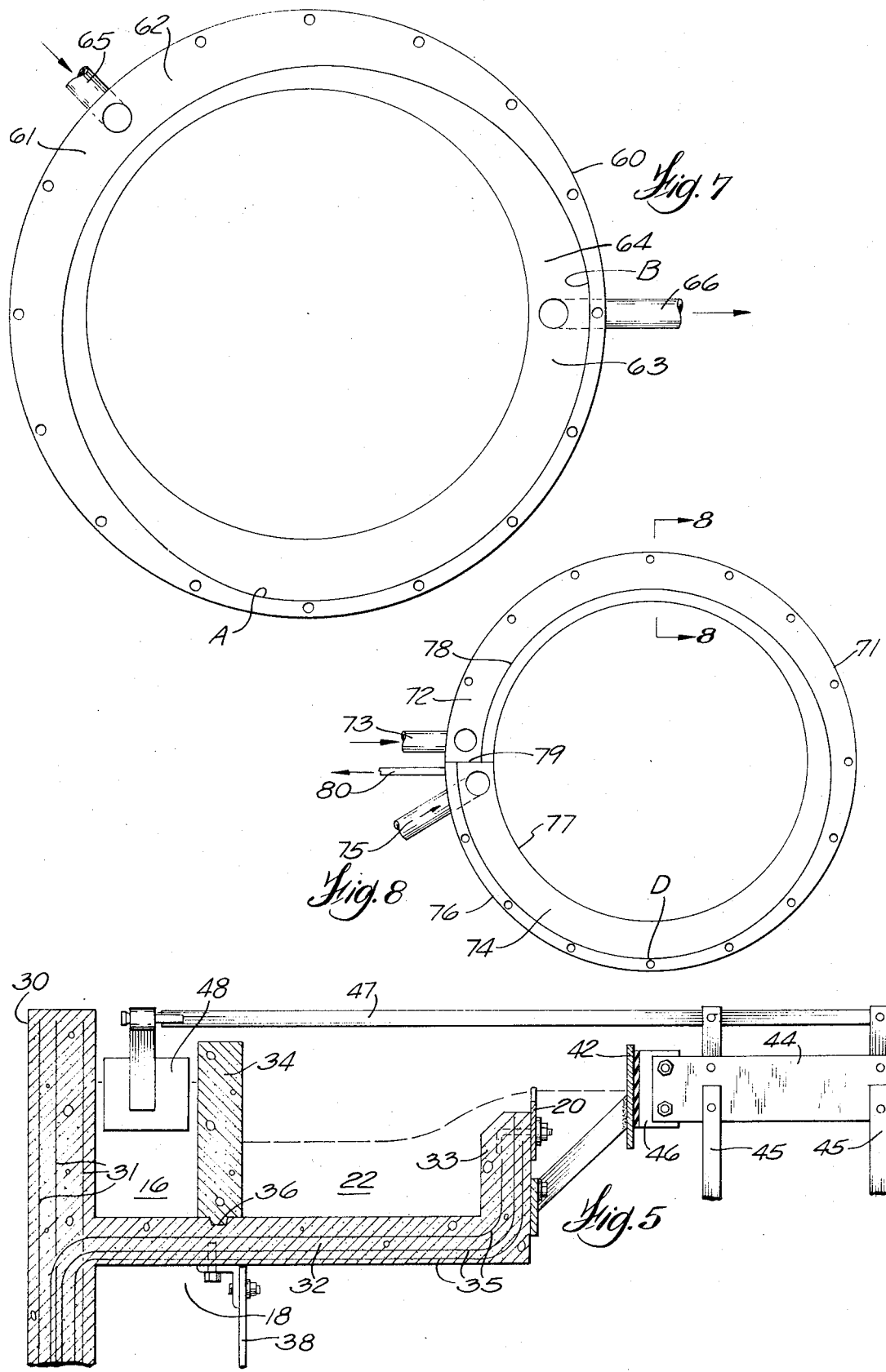

PERIPHERAL FEED AND EFFLUENT SYSTEM FOR SEDIMENTATION TANKS

BACKGROUND OF THE INVENTION

One form of large sedimentation tank, in the order of up to 200 feet in diameter, is used in sewage and waste treatment and has a peripheral feed distribution system as well as a peripheral overflow launder or effluent trough. However, the construction of adjoining feed and effluent troughs has been complicated by the hydraulic requirements of such channels.

As is known, relatively long feed channels must diminish in cross-section and relatively long effluent channels or overflow launders must increase in cross-section in their directions of flow so that the velocity of the flows and head losses are not excessive. A minimum flow velocity is also required so that suspended materials cannot settle and accumulate on the floor of either channel.

Such channels are generally provided with a varying width as well as a sloping floor to provide the desired varying cross-section. However, the construction of such channels involves practical difficulties which become particularly sever where two such channels are to be constructed together and in adjoining relationship. If the construction is of concrete, the forms for forming the channels are complex and the embedded reinforcing bars which must extend from the supporting wall of the tank must reach to the innermost channel wall. Each bar requires numerous bends at different spacings each according to the bar's location in the completed tank. Similarly, the wooden forms for forming the concrete tank are of considerable geometric complexity. If the tank is to be constructed entirely of steel, or if the channels are to be of steel and secured to a concrete wall, the steel plates must be cut to innumerable different shapes and assembled in certain sequences.

SUMMARY OF THE INVENTION

According to the present invention the adjoining feed and effluent channels are of complementary dimensions so that their combined width is uniform but their diminishing widths nonetheless provide the desired hydraulic gradient. Alternatively the intermediate wall may be arranged so that the channels taper in width along corresponding lengths less than their total lengths such that a more pronounced taper is provided, while their remaining lengths are of uniform width.

The influent and effluent channels thus may include a single structural member of uniform width and construction projecting inwardly of the tank to comprise the floor of both the peripheral feed channels and of the peripheral effluent channels. The tank wall forms the outside wall of the outer channel; a concentric wall forms the inside wall of the inner channel; a circular intermediate wall is set on the member so that two inner oppositely extending and two outer oppositely extending channels are provided to comprise respectively the desired effluent and feed channels.

BRIEF DESCRIPTION OF THE DRAWINGS

FIG. 1 is a plan view of a sedimentation tank embodying the invention.

FIG. 2 is a section taken on line 2—2 of the tank shown in FIG. 1.

FIG. 3 is a cross-section of a part of the tank taken on line 3—3 of FIG. 1 and showing the inlet pipe connection with the outer channel.

FIG. 4 is a cross-section of a part of the tank taken on line 4—4 of FIG. 2 and showing the effluent pipe connection with the inner channel.

FIG. 5 is an enlarged section taken on line 5—5 of FIG. 1 and further shows in elevation a part of the skimming mechanism which may also be employed.

FIG. 6 is a section of a similar tank and showing the same as it would be constructed of steel.

FIG. 7 is a plan view of a tank having two inner and two outer channels with an alternate arrangement which is suitable or adequate such as where the inlet and outlet connections are not on opposite sides of the tank.

FIG. 8 is a plan view of a tank with a single outer feed channel which is of diminishing width for about two-thirds of its length and is of uniform width the remaining one-third of its length. The inner effluent-overflow channel is for about two thirds of its length. The influent and effluent connections with the tank are relatively adjacent to each other.

DESCRIPTION OF THE PREFERRED EMBODIMENT

The peripheral feed clarifier shown in FIG. 1-5 of the drawings includes the tank 12 and the rotating eduction mechanism 13. In the operation of the clarifier, the feed enters the tank through feed pipe 14 and one half of the feed flows in each direction around the tank in the respective feed channels 15 and 16.

The feed or raw flow from channels 15 and 16 is discharged downwardly through the ports 17 to enter the peripheral distribution zone 18 extending around the tank below the channels and then enters the tank from the lower open end of zone 18. The overflow from the tank passes over the adjustable peripheral weir 20 shown in FIG. 5 and flows around the tank in the effluent channels 21 and 22 to the effluent pipe 23. As shown, the two channels 15 and 21 and the other two channels 16 and 22 adjoin each other and are of oppositely diminishing cross-section. The two outer channels 15 and 16 are not physically separated at their adjoining ends. As such they will appear to be a single channel with a center feed.

The two inner channels 21 and 22 may similarly appear to be a single channel with a center draw-off. The rotating mechanism 13 of clarifier 11 as shown includes the tapered eductor header 24 for withdrawal of the sludge settling on the floor 25 of tank 12. In the operation of eductor mechanism 13, header 24 moves over the floor of the tank and the sludge entering through the ports of the header flows to the base 26 to which the larger end of the header is connected. The rotating base 26 of the mechanism communicates with the sludge collection or disposal means, not shown. Various other types of sludge withdrawal means, of course, may be employed in a clarifier embodying the present invention.

In preparation for the construction of tank 12 of concrete, temporary forms, not shown, are provided for pouring the entire side wall 30 including the necessary internal steel reinforcing bars 31 as indicated, for example, in FIG. 5. The upper end of side wall 30, as it is formed and poured, also includes the circular shelf 32 extending inwardly of the wall and the circular inner wall 33 which forms the inner wall of channels 21 and 22. Walls 30 and 33 are uniformly spaced and shelf 32 is of uniform width at all locations around the tank so that the construction of the forms for pouring as described is greatly simplified. It should be noted that the wall 34 between channels 15 and 21 and between 16 and 22 is circular but is not included in the initial construction of the tank. That is, wall 30, shelf 32 and wall 33 as constructed, form a single, wide circular structure with generous access to the upper surface of the shelf across its entire width for pouring and finishing the concrete. In constructing shelf 32, suitable inserts, not shown, are also readily provided to form the ports 17. The reinforcing 35 for shelf 32 and wall 33 extends from wall 30 and because of their uniform dimensions, reinforcing 35 is identical throughout the entire periphery of the tank.

After shelf 32 and wall 33 are completed and hardened, the dividing wall 34 is added. Wall 34 may be of steel plate, not shown, which is set upright so that its lower edge is in sealing engagement with shelf 32, or wall 34 may be of arcuate concrete sections which are performed and set and grouted in place. Alternately, concrete pouring forms, not shown, may be set up on shelf 32 and braced between walls 30 and 33 and the wall 34 may be poured directly on shelf 32. Suitable sealing means as at the joint 35 therebetween may be provided.

At some suitable time also, the steel skirt 38 may be attached to the underside of shelf 32. Skirt 38 extends downwardly several feet from shelf 32 and is uniformly spaced from wall 30 of the tank to define therewith the distribution zone 18 above referred to.

Tank 12, as shown, is typically up to two hundred feet in diameter and has a flow capacity of up to 30,000,000 gallons per day. Since the flow in feed channels 15 and 16 should not exceed three or four feet per second, their wetted cross-section must be in the order of 10 to 15 square feet at their inlet end at the location of feed pipe 14. Heretofore, such channels have been constructed of diminishing depth and width to accommodate such flows and maintain the flow velocity within suitable limits. Channels 15 and 16, on the other hand, are 3 feet in depth throughout their length, are 4 feet in width at their influent end and might be as narrow as nine inches in width at their opposite ends which adjoin each other. With respect to the flow in channels 21 and 22, the same general considerations apply although the flow velocity may be somewhat greater and vary within wider limits. As shown, influent pipe 14 and effluent pipe 23 extend through wall 30 of tank 12 and open upwardly into the respective channels. Particularly in the construction of larger tanks pipe 14 may open directly into a drop box and a sump may be provided for the effluent.

As is well known, the settling tanks and clarifiers of a sewage treatment plant may require mechanical means for skimming the water surface and removing the floating material which generally includes grease and fats. Tank 12 is provided with the scum baffle 42 which extends entirely around the periphery of the tank and is supported by the brackets 43 which project from inner wall 33 of tank effluent troughs. Baffle 42 extends above and below the water surface and prevents the floating material from passing over weir 20. The baffle 42 is uniformly spaced from the adjustable weir 20 and is thus also concentric with respect to the vertical axis of rotating mechanism 13. This facilitates the provision of skimming means such as skimming blade 44 shown in part in FIG. 5 and which can be carried by the rotating mechanism in any suitable manner. For example, the uprights 45 to which the blade 44 is secured may be attached to and project upwardly from the header 24. The flexible wiper 46 at the end of blade 44 moves around the tank. Additionally, suitable scum removal means, may also be provided or, the scum which is collected ahead of blade 44 may be periodically removed with a dipper, not shown.

In some installations skimming of the flow in the feed channels may also be desireable and may be variously provided for. As shown in FIG. 5, the arm 47 extending from blade 44 over the feed channels may be provided with the pivotal depending blade or paddle 48. Paddle 48 is thus disposed to operate in the feed channels of tank 12 although it will be noted that the paddle is not entirely functional throughout the length of each feed channel 15 and 16.

That is, the rotating mechanism 13 is unidirectional and turns only clockwise as viewed in FIG. 1. The flow in feed channel 16, however, is counterclockwise as shown and so the paddle merely disperses the scum in channel 16. This is not unsatisfactory because some of the floating material becomes settleable and some is carried into the tank through ports 17 and some will be carried into channel 15.

The scum in channel 15 is, of course, pushed in the direction of flow. The paddle 48 cannot be wider than the narrowest part of channel 15 which is at or near the location of effluent pipe 23, as shown in FIG. 1. A type of paddle, not shown, which is of variable width may, of course, be used but the mechanical complications of such a paddle are considered here to be readily avoidable.

As paddle 48 reaches the location just referred to, the scum may be removed manually where the amount of scum present generally makes this no more than an occasional or a daily chore. A modification of the channels is also possible to further improve the operation of paddle 48, and will be described hereinafter.

In the alternate form of construction shown in FIG. 6 the steel tank 42 includes the steel side wall 51 and the shelf 52 which supports the inner wall 53 and the divider wall 54 which separates the channels. Shelf 52 is formed of a series of identical steel plates which in plan are sectors between arcs which correspond with the curvature of walls 51 and 53. These plates may be provided with the ports 55 when they are cut to shape. Walls 53 and 54 are each of uniform height throughout and are thus also of economical construction. Their assembly by welding at the site prepared for the tank may be similar to that of tank 12. That is, shelf 52 may be first welded to wall 51, the skirt 56 may be welded to the underside and outer wall 63 is welded to the top inner edge of the shelf. The divider wall 54 may then be welded to shelf 52 with the corner welds on outer side of the wall in the wider part of the outer channel and on the inner side of wall 54 in the wider part of the inner channel. Wall 53 is similarly provided with the adjustable weir 56 which extends around the tank. The tank 60 shown in plan in FIG. 7 includes the two feed channels 61 and 62 and the two effluent channels 63 and 64 which are of different lengths because of the relative locations of the feed pipe 65 and the effluent pipe 66.

The two feed channels 61 and 62 extend oppositely from the feed pipe 65 and diminish in width to locations A and B which are each spaced around the tank about 135° from the pipe 65. The terminal sections of the two feed channels 61 and 62 between locations A and B are of uniform width and section. The effluent channels 63 and 64 as constructed are of complementary cross sections. It should be noted that in some cases where the plant layout might require, the feed pipe 65 may be located some distance from that shown without seriously impairing the hydraulic efficiency of the tank.

Similarly, the effluent pipe 66 may if necessary be located anywhere between locations A and B or for example at location B as shown. In the embodiment shown, the actual flow in effluent channels 63 and 64 might be in opposite directions from a location which is nearly opposite effluent pipe 66 rather than from the location of their narrowest width.

The tank 71 shown in plan in FIG. 8 is provided with a single outer feed distribution channel 72 which extends from the feed pipe 73 entirely around the tank. The inner effluent channel 74 similarly extends fully around the tank. The channels are defined by the outer tank wall 76 and the inner wall 77 which are concentric and by the intermediate wall 78. The adjoining ends of the two channels are separated by the radial wall 79 which is located between the feed pipe 73 and the effluent pipe 75. The two channels are complementary as to their widths such that the outer channel 72 diminishes in width in the direction of flow from feed pipe 73 to location D which is approximately 270° therefrom and with reference to the flow circumferentially of the tank. From location D to the end wall 79, the channel walls are uniformly spaced from each other.

By this arrangement, the terminal portion of the feed channel 72 is of uniform width. This uniform width may be of advantage if the flow carries some amount of floatable material which forms a scum requiring regular or periodic removal from the feed channel by hand-operated or with mechanically operated means. The pipe 80 is connected to the end of channel 72 at wall 79 as for the periodic withdrawal of the scum.

In particular, the scum paddle 48 shown in FIG. 5 when employed with tank 71 operates effectively to move the scum in the section of the feed channel 72 from location D to the radial wall 79. The paddle 48 is, of course, suitably pivoted so that it can pass over the wall 79 and suitable scum withdrawal means may also be provided and connected with the pipe 80.

It should also be understood that tanks 12, 60 and 71 while embodying the present invention, may instead be of any polygonal shape as well as circular. That is, in any such tank the weir, considered here to include the entire inner wall of the effluent channels, is of uniform height and spacing from the outer wall of the tank and the diminishing cross-sections of the several channels is provided by the offset relation of the intermediate or dividing wall.

I claim:

1. A sedimentation tank having a bottom and upright outer wall, a peripheral feed and effluent trough system including the upper part of the upright outer wall and comprising a horizontal shelf of uniform width supported by and projecting inwardly of the tank from the outer wall thereof, an inner wall of uniform height and supported by and extending upwardly from the inner periphery of said shelf, an intermediate wall of uniform height supported on said shelf between said inner and outer walls and nearer the inner tank wall at a first location and nearer the outer wall at a second location and defining therewith outer and inner troughs, feed and effluent pipes extending through the outer wall of the tank and communicating respectively with said inner and outer troughs at said first and second locations, the outer trough having a series of ports opening through the shelf and downwardly into the tank for the feed, the upper edge of said inner wall being disposed to function as a weir and control the overflow into the inner trough.

2. The invention of claim 1 wherein the tank further includes a skirt extending downwardly from and supported by the shelf, said skirt being uniformly spaced from the outer wall to provide a distribution zone for the feed from said ports, said zone being open at its lower end for introduction of the feed into the tank at a uniformly low velocity.

3. The invention of claim 1 wherein the tank includes a fixed scum baffle uniformly spaced from the center of the tank and a scum withdrawal pipe connected to the outer feed trough relatively near said second location.

4. The invention of claim 3 wherein the tank includes a rotating mechanism for withdrawal of the sludge settled on the tank bottom, a movable skimmer blade having one end contiguous to said fixed scum baffle and carried by said mechanism and further including an upper arm extending over the inner troughs, and a flat plate carried by said arm and disposed in the outer trough to move the scum therein to said scum withdrawal means.

5. The invention of claim 1 wherein the outer tank wall, the shelf and the inner wall are of monolithic concrete construction, the intermediate wall is of separate construction, and a seal is provided between the shelf and the bottom of the intermediate wall.

6. In a sedimentation tank having an overflow weir of uniform height and spacing from the outer wall of the tank, a single horizontal shelf projecting inwardly from the tank wall to said weir and supporting the latter, and a dividing wall supported by said shelf intermediate said weir and tank wall and defining therewith inner and outer semi-peripheral channels, a feed pipe having a connection with adjoining ends of the outer channels at one side of the tank and an effluent pipe having a connection near the other side of the tank with adjoining ends of the inner channels, said shelf having ports opening from the outer channel downwardly into the tank, said dividing wall being spaced nearer the weir at the feed pipe connection and nearer the tank wall at the effluent connection such that the two feed channels diminish in cross-section in the direction of flow and the effluent channels increase in cross-section in the direction of flow.

7. The sedimentation tank of claim 1 which further includes a rotary sediment removing mechanism which operates about the center of the tank, and a scum baffle carried by and spaced uniformly inwardly of the overflow weir.

8. A sedimentation tank having an outer wall, an overflow weir of uniform height and spacing from said outer wall, a horizontal shelf projecting inwardly from the tank wall to said weir and supporting the latter, and a dividing wall supported by said shelf intermediate said weir and tank wall and defining therewith inner and outer semi-peripheral channels, a feed pipe having a connection with adjoining ends of the outer channels at one side of the tank and an effluent pipe having a connection near the other side of the tank with adjoining ends of the inner channels, said shelf having ports opening from the outer channel downwardly into the tank, said dividing wall being spaced nearer the weir at the feed pipe connection and nearer the tank wall at the effluent connection such that the two feed channels generally diminish in cross-section in the direction of flow and the effluent channels increase in cross-section in the direction of flow, the section of said dividing wall of less than one-half of the circumference of the tank which is adjacent to said effluent connection being uniformly spaced from said weir and tank wall such that the terminal sections of the feed channels are of a narrow, uniform width.

9. The sedimentation tank of claim 8 which further includes a rotary sediment removing mechanism which operates about the center of the tank, and a scum moving baffle carried by said mechanism and movable about the center of the tank and in said feed channels to disperse the scum collecting in the terminal sections of the feed channels.

10. In a sedimentation tank having an overflow weir of uniform height and spacing from the outer wall of the tank, a single horizontal shelf projecting inwardly from the tank wall to said weir and supporting the latter, and a dividing wall supported by said shelf intermediate said weir and tank wall and defining therewith inner and outer semi-peripheral channels, a feed pipe having a connection with the adjacent ends of the outer channels at one side of the tank, said shelf having ports opening from the outer channel downwardly into the tank, said dividing wall being spaced nearer the weir at the feed pipe connection and nearer the tank wall on the opposite side of the tank such that the two feed channels diminish in cross-section in the direction of flow, and an effluent pipe having a connection with adjoining ends of the inner channels.

11. A sedimentation tank having an outer wall, a rotating center-supported sediment removing mechanism, a horizontal shelf of uniform width supported by and extending inwardly from said wall, an upright inner wall at the inner periphery of the shelf forming an overflow weir, a cross-wall extending across said shelf from the outer wall to the inner wall, a dividing wall supported by said shelf between said inner and outer walls and extending from one side of said cross-wall to the other side thereof and defining therewith adjoining circumferential inner and outer troughs, said dividing wall being spaced nearer the inner wall at one side of the cross-wall which therewith defines the larger inlet end of the outer trough, said dividing wall on the other side of the cross-wall being spaced nearer the outer wall and defining therewith the terminal end of the outer trough, a feed pipe opening into said inlet end of the outer trough and an effluent pipe communicating with the inner trough where it adjoins said terminal end of the outer trough, said shelf having a series of ports opening from said outer trough for introducing the feed into the tank below the shelf.

* * * * *